(No Model.)

W. F. CORNELIUS.
CASTER FOR ROLLER SKATES.

No. 330,097. Patented Nov. 10, 1885.

WITNESSES.
Gustav Bohn.
William E. Barton.

INVENTOR.
Wilbur F. Cornelius.
By C. F. Jacobs
Atty.

UNITED STATES PATENT OFFICE.

WILBUR F. CORNELIUS, OF INDIANAPOLIS, INDIANA.

CASTER FOR ROLLER-SKATES.

SPECIFICATION forming part of Letters Patent No. 330,097, dated November 10, 1885.

Application filed July 20, 1885. Serial No. 172,053. (No model.)

*To all whom it may concern:*

Be it known that I, WILBUR F. CORNELIUS, a resident of Indianapolis, Indiana, have made certain new and useful Improvements in Casters for Roller-Skates, a description of which is set forth in the following specification, reference being made to the accompanying drawings, in the several figures of which like letters indicate like parts.

My invention relates to an improvement in casters for roller-skates, and is designed to secure and provide an easy bearing, insuring freedom of movement of the axle, and a convenient and ready means of oiling the parts, and will be understood from the following description.

Figure 1:
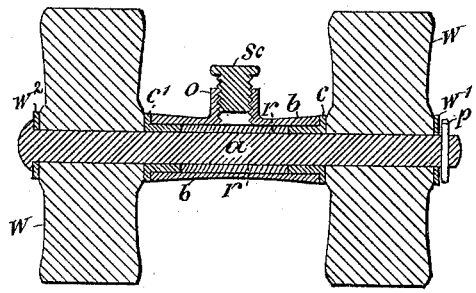
Figure 2:
Figure 3:
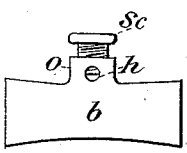

In the drawings, Figure 1 represents a longitudinal section of my device, with the wheels mounted on the axle, showing the interior arrangement of the parts. Fig. 2 is a cross section through the center of the screw that closes the oil-cap and the axle; and Fig. 3 is a side view from the rear of the boxing, with the oil-cap and screw in place.

In detail, $a$ is the axle, having a head at one end, and a hole through the other to permit the insertion of the pin $p$ for confining the wheels $w$ thereon. $w'$ and $w^2$ are outside washers. $b$ is a cylindrical boxing, having a central bore larger than the axle, through which the axle passes. $r$ are small steel pins or rollers, which are placed about the axle, and between it and the boxing, as shown in Fig. 2. $c$ and $c'$ are flanged collars, which fit into the ends of the boxing $b$ and against the rollers $r$, keeping them in place. These collars have flanges on their outer ends, against which the wheel abuts. $o$ is a boss projecting from the side of the boxing $b$, threaded to receive the screw $sc$. This projection has a hole, $h$, through which the oil may be poured from the can in upon the axle $a$ and rollers $r$. The screw $sc$, when screwed down, is adapted to pass this hole, so as to close it up entirely and prevent the oil from escaping. Thus it is not necessary, when desiring to oil the axle, to entirely withdraw the screw $sc$, but merely to loosen it, so that the lower end of the screw will not close the hole $h$, and when the oiling is completed the screw is screwed down again, closing the hole $h$.

I am aware that the use of rollers upon an axle, and confined between such axle and the boxing, is old and well known, and have been used for wheels of various kinds, and buggies and bicycles, and in roller-skates; but in all these the pins each have been of the same length as the boxing, and the result is that when turning a curve the ends of these pins will wear and cut away the upper inner surface of the boxing $b$ and in time destroy it.

In my device the pins or rollers $r$ are made shorter than the boxing, and are confined between the ends of the flanged collars $c$. These collars have a movement of their own upon the axle $a$, and when unusual pressure is brought upon one side, the collar, revolving, distributes this around the collar, and the wear is even, and no part thereof is more liable to be cut or worn away than the other.

I am aware also that the use of oil caps or cups upon axles is not new, and do not broadly claim such a device as my invention.

What I claim as my invention, and desire to secure by Letters Patent, is the following:

1. In a roller-skate, a pair of wheels mounted upon an axle common to both, a boxing, $b$, having a larger bore than the axle, through which boxing such axle passes, flanged collars inserted in each end of such boxing, the bores of the collars being of the same size as the axle, and a series of anti-friction rollers interposed horizontally between the inner ends of these collars and vertically between the boxing and the axle, all combined substantially as described.

2. The axle $a$, having a head at one end and an opening to receive the pin $p$ at the other, the wheels $w$, mounted thereon, the hollow boxing $b$, provided with the oil-cap $o$, having hole $h$, the screw $sc$ for closing the opening in such oil-cap, the flanged collars $c$ and $c'$, and the rollers $r$, all combined substantially as described.

In witness whereof I have hereunto set my hand this 16th day of July, 1885.

WILBUR F. CORNELIUS.

Witnesses:
WM. E. BARTON,
C. P. JACOBS.